US006934848B1

(12) United States Patent
King et al.

(10) Patent No.: US 6,934,848 B1
(45) Date of Patent: Aug. 23, 2005

(54) TECHNIQUE FOR HANDLING SUBSEQUENT USER IDENTIFICATION AND PASSWORD REQUESTS WITHIN A CERTIFICATE-BASED HOST SESSION

(75) Inventors: Julie H. King, Raleigh, NC (US); Susan D. Kirkman, Cary, NC (US); Daniel J. Labrecque, Chapel Hill, NC (US); Linwood H. Overby, Jr., Raleigh, NC (US); Steven Wayne Pogue, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 09/619,205

(22) Filed: Jul. 19, 2000

(51) Int. Cl.[7] .......................... H04L 9/00; G06F 11/30
(52) U.S. Cl. .................. 713/182; 713/201; 713/156; 713/185; 707/9; 705/65
(58) Field of Search ........................ 713/200–202, 713/156, 183, 175, 182, 185; 705/51, 65, 21, 8; 707/9, 10

(56) References Cited

U.S. PATENT DOCUMENTS

| | | | | |
|---|---|---|---|---|
| 5,659,616 A | * | 8/1997 | Sudia ........................... 705/76 |
| 5,684,950 A | * | 11/1997 | Dare et al. ................... 713/201 |
| 5,689,566 A | | 11/1997 | Nguyen | |
| 5,884,312 A | * | 3/1999 | Dustan et al. ................. 707/10 |
| 5,944,824 A | * | 8/1999 | He ............................. 713/201 |
| 6,105,131 A | * | 8/2000 | Carroll ........................ 713/155 |
| 6,178,511 B1 | * | 1/2001 | Cohen et al. ................ 713/201 |
| 6,356,941 B1 | * | 3/2002 | Cohen ......................... 709/219 |
| 6,405,214 B1 | * | 6/2002 | Meade, II ................ 707/104.1 |
| 6,438,690 B1 | * | 8/2002 | Patel et al. .................. 713/156 |
| 6,584,505 B1 | * | 6/2003 | Howard et al. ............. 709/225 |
| 6,606,708 B1 | * | 8/2003 | Devine et al. .............. 713/201 |
| 6,609,198 B1 | * | 8/2003 | Wood et al. ................. 713/155 |
| 6,629,246 B1 | * | 9/2003 | Gadi ........................... 713/202 |
| 6,671,808 B1 | * | 12/2003 | Abbott et al. ............... 713/200 |
| 6,678,731 B1 | * | 1/2004 | Howard et al. ............. 709/225 |

OTHER PUBLICATIONS

IBM Technical Bulletin, Customized Handling of application Errors under os/2, Apr. 1, 1992, vol. 34, pp. 459–461.*
Schneier, Applied Crytography, 1996, John Wiley & Sons, Inc., Second Edition, 574–575.*
Davies, Computer Networks and their Protocols, 1979, John Wiley & Sons, Inc., 355–374.*
Schneier, B. "Applied Cryptography", 1996, John Wiley and Sons, p. 59.

* cited by examiner

*Primary Examiner*—Gilberto Barrón
*Assistant Examiner*—Taghi T. Arani
(74) *Attorney, Agent, or Firm*—Jerry W. Herndon; Marcia L. Doubet

(57) ABSTRACT

The present invention provides a method, system, and computer program product for enabling a user to provide a single system sign-on for accessing one or more legacy host applications and/or one or more systems which provide legacy host data (such as legacy database systems) during a secure host access session which is authenticated using a digital certificate and is protected by a host-based security system, such as RACF (Resource Access Control Facility, a product offered by the IBM Corporation), where the same set of credentials must be provided more than once during the secure session. The subsequent provision of the credentials may be transparent to the user, and does not require change to existing legacy applications or systems.

28 Claims, 9 Drawing Sheets

FIG. 5

```
Client                                    Server
---------------------------               ---------------------------
    ┌ Telnet negotiations in progress between Client and Server...
    │                                     <-- IAC DO NEW-ENVIRON
    │
    │ IAC WILL NEW-ENVIRON      -->
    │
    │                                     <-- IAC SB NEW-ENVIRON SEND
    │                                         USERVAR PASSTICKET
510 │                                         USERVAR APPLID
    │                                         IAC SE
    │
    │ IAC SB NEW-ENVIRON IS     -->
    │ USERVAR PASSTICKET VALUE YES
    │ USERVAR APPLID VALUE
    │ IAC SE
    │
    │ ...
    └ Finish Telnet negotiations.
                                          Server sends USS MSG10.
      Client starts Logon macro

┌ IAC SB NEW-ENVIRON INFO    --->
525 │ USERVAR APPLID VALUE RALVMS
    └ IAC SE

...

┌ IAC SB NEW-ENVIRON INFO    --->
555 │ USERVAR APPLID VALUE TSO1
    └ IAC SE
```

FIG. 9

```
Client                                   Server
-----------------                        -----------------
 ┌ Telnet negotiations in progress between Client and Server...
 │                                        <-- IAC DO NEW-ENVIRON
 │
 │ IAC WILL NEW-ENVIRON     -->
 │
 │                                        <-- IAC SB NEW-ENVIRON SEND
 │                                            USERVAR PASSTICKET
 │                                            USERVAR APPLID
 │                                            USERVAR CERTIFICATE
 │                                            USERVAR RSEEDrandomvalue
910                                           USERVAR AUTHINFO
 │                                            IAC SE
 │
 │ IAC SB NEW-ENVIRON IS     -->
 │ USERVAR PASSTICKET VALUE YES
 │ USERVAR APPLID VALUE
 │ USERVAR CERTIFICATE VALUE
 │ USERVAR RSEEDrandomvalue VALUE
 │ USERVAR AUTHINFO VALUE
 │ IAC SE
 │ ...
 └ Finish Telnet negotiations.
                                          Server sends USS MSG10.
  Client starts Logon macro ┌ IAC SB NEW-ENVIRON INFO     --->
 925 │ USERVAR APPLID VALUE RALVMS
     └ IAC SE
       ...
     ┌ IAC SB NEW-ENVIRON INFO     --->
     │ USERVAR APPLID VALUE TSO1
 955 │ USERVAR CERTIFICATE VALUE <certificate contents>
     │ USERVAR AUTHINFO  <random || sequence number || applid value>
     └ IAC SE
```

TECHNIQUE FOR HANDLING SUBSEQUENT USER IDENTIFICATION AND PASSWORD REQUESTS WITHIN A CERTIFICATE-BASED HOST SESSION

RELATED INVENTIONS

The present invention is related to U.S. patent (Ser. No. 09/466,625, filed Dec. 17, 1999), titled "Providing End-to-End User Authentication for Host Access Using Digital Certificates", and U.S. patent (Ser. No. 09/619,912, filed concurrently herewith), titled "Technique for Handling Subsequent User Identification and Password Requests with Identity Change within a Certificate-Based Host Session", both of which are commonly assigned to the International Business Machines Corporation (IBM) and which are hereby incorporated herein by reference.

BACKGROUND OF THE INVENTION

1. Field of the Invention

The present invention relates to a computer system, and deals more particularly with a method, system, and computer program product for handling user identification and password requests for user sign-on which occur during a host access session which is authenticated using digital certificates, after an initial user sign-on has already completed.

2. Description of the Related Art

One of the challenges facing information services ("IS") professionals today is the difficulty of providing secure access to legacy mainframe host data and applications from modern personal computer-based ("PC-based") applications. As more large companies move to provide business integration and self-service on the World Wide Web (hereinafter, "Web"), there is most often data that is crucial to this movement, but which is based on (and is only accessible through) legacy mainframe host applications. These host applications and their data have, from their origin, been typically protected through the use of the program product commonly referred to as "RACF" (Resource Access Control Facility) or other similar mainframe-based security systems. ("RACF" is a registered trademark of the IBM Corporation.) These mainframe-based security systems typically require a user identification and password in order to gain access to the protected applications and data. Therefore, when a user tries to access data or legacy applications on a host mainframe from a client workstation over a network connection, they normally must provide a separate user identification and password to the host application to satisfy the security requirements of the host security system in addition to the user identification and password they use to access the modern environments (e.g. to access the Internet or Web). This double entry of identifying information is not only redundant but tedious for the user as well.

With the wide-spread use of SSL (Secure Sockets Layer) and certifiable digital certificates for providing security in today's PC-based computing environments, there is a desire to use a client certificate as the basis for a "single system sign-on" to all of a user's Internet-based applications. This includes applications that provide access to legacy host applications and/or data such as IBM's Host-On-Demand, Personal Communications, and Host Publisher products. The way in which users identify themselves to these products should be consistent with how they do so with other Web applications. This will enable minimizing the number of different user identifications and passwords a user must create and remember, and reduce the administrative burden of maintaining security (e.g. by reducing the number of requests for an administrator to reset a forgotten password) for password-protected applications and data.

Digital certificates may be used to authenticate entitles, as is well known in the art. U.S. Pat. No. 6,128,728 (Ser. No. 09/064,632, filed Dec. 10, 1998), which is titled "Certificate Based Security in SNA Data Flows", teaches a teaches a technique whereby digital certificates are transported in appropriate Systems Network Architecture ("SNA") data flows between a client and a host for identifying the user to the host application, this existing technique requires those host programs which authenticate the user to RACF (or other host access control facility) to be modified to use the certificate instead of the traditional user ID (user identifier) and password. This requires an enterprise to upgrade each of its application subsystems in order to achieve the benefits. So for some enterprises, the previous approach may be impractical and unacceptable.

Related U.S. Pat. No. 6,823,452 titled "Providing End-to-End User Authentication for Host Access Using Digital Certificates" and referred to hereinafter as "the related invention", discloses a technique for using digital certificates to authenticate a client in order to allow the client to access legacy host applications and/or data which are protected by a security system such as RACF, where these host applications or systems for managing host data (including legacy database systems) typically require a user identification and password that: is supplied separate from that used for the client's sign-on process to the modern environment. Thus, the related invention enables the user to access a legacy host application and/or legacy host data with a single sign-on (i.e. without reidentifying himself), and does not require modifications to the legacy software.

In the related invention, SSL or a similar security protocol is used to establish a connection between a client device and either a Web application server or a Telnet 3270 ("TN3270") server. The client's digital certificate is required when establishing the SSL connection, according to the prior art SSL specification, to enable the Web application server or TN3270 server to authenticate the client. The certificate is then cached at the server, according to the related invention, and used to authenticate the client to the host-based, legacy security system. Once the security system has successfully authenticated the client, it may return a password or password substitute. (The password substitute is called a "passticket" when using the RACF security system, where a passticket is a relatively short-lived credential that is dynamically generated after a user's identity has been authenticated.) Rather than requiring the user to re-enter his identifier and password to communicate with the protected legacy host system, the Web application server or TN3270 server provides the user's ID and the passticket to the host system, enabling the user to be transparently yet securely logged on to the host system. (The related invention discloses the Web application server or TN3270 server alternatively providing the host system with a user ID and an actual password which has been authenticated by a security system, rather than a user ID and passticket, for those environments in which the passticket concept does not exist.)

However, the related invention addresses the capability only for an initial sign-on sequence to a host application. There may be cases where a subsequent sign-on is required. For example, a particular host application may process transactions that have special security needs (such as heightened security requirements), and which require the sign-on process of obtaining and verifying the user's identification and password again in the context of a special transaction. Or, a legacy application may be written such that it repeats the sign-on process to re-verify the user after occurrence of particular situations, such as an outage of some sort, a dormancy in session activity, etc. As another example, the user may wish to change from using one legacy host application to using another legacy application. Each legacy application typically begins by sending a sign-on screen to the user, with the intent of prompting the user to enter his user ID and password. The related invention does not provide a technique that enables a subsequent sign-on to be processed without requiring the user to re-identify himself during the scope of a single secure session (e.g. without tearing down the SSL session and repeating the secure session establishment), nor is this capability available in the prior art.

Furthermore, there may be cases where it would be desirable to provide different sign-on credentials during a secure host access session, following the initial sign-on. As an example, it may be necessary for the current legacy host application user's supervisor to sign on to the legacy application, such as when a special transaction requiring supervisory authority is to be performed. Or, it may happen that different security credentials are required for a user when he wishes to change from one legacy host application to another. As another example, there may be applications for which it is necessary or desirable to force the user to re-authenticate himself by providing his security credentials again (for example, by swiping his Smart Card through a Smart Card reader) at defined points, such as when a new application transaction begins. Because establishing a secure connection between the client and the TN3270 server or Web application server using a security protocol such as SSL is relatively expensive in terms of computation and networking resources, the performance overhead incurred in re-starting the session in order to supply a different certificate that signifies different user credentials makes this a less-than-optimal solution. Thus, a technique is needed which enables changing the user's credentials within the scope of an on-going secure session. Neither the prior art nor the related invention provide this capability.

Accordingly, what is needed is a technique that overcomes these limitations of the prior art.

SUMMARY OF THE INVENTION

An object of the present invention is to provide a technique for processing a subsequent sign-on during a session that accesses legacy host applications and/or data in a distributed networking environment, using a previously-submitted certificate for authentication.

Another object of the present invention is to provide this technique in a manner that does not require the user to re-identify himself.

Another object of the present invention is to provide this technique without requiring any modification to the existing legacy host applications.

Yet another object of the present invention is to provide this technique by using digital certificates for authentication.

Another object of the present invention is to provide a technique to enable changing from accessing one legacy host application to accessing another legacy host application within the scope of a single secure session, without requiring the user to re-identify himself.

Yet another object of the present invention is to provide this technique without requiring the secure session to be restarted.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, system, and method for enabling a subsequent and transparent user sign-on during a certificate-based host session. This technique comprises: processing a first sign-on during a secure session using a digital certificate; and processing a subsequent sign-on during the same secure session using the same digital certificate, wherein the subsequent sign-on requests access to the same secure legacy host application or a different legacy host application.

Processing the first sign-on further comprises: establishing the secure session from a client machine to a server machine using the digital certificate, wherein the digital certificate represents an identity of the client machine or a user thereof; storing the digital certificate or a reference thereto at the server machine; establishing a session from the server machine to a host system using a legacy host communication protocol; passing the stored digital certificate or the reference from the server machine to a host access security system; authenticating, by the host access security system, the identity using the passed digital certificate or a retrieved certificate which is retrieved using the reference; using the passed or retrieved digital certificate to locate access credentials for the user; accessing a stored password or generating a password substitute representing the located credentials; and using the stored password or the generated password substitute to transparently complete the first sign-on to a secure legacy host application executing at the host system.

Processing the subsequent sign-on further comprises: receiving a subsequent sign-on request requiring the same identity; retrieving the stored digital certificate or reference; passing the retrieved digital certificate or reference from the server machine to the host access security system; re-authenticating, by the host access security system, the identity using the passed retrieved digital certificate or retrieved reference; using, by the host access security system the passed retrieved digital certificate or retrieved reference to again re-locate the access credentials for the user; re-accessing the stored password or generating a new password substitute representing the re-located credentials; and using the re-accessed stored password or the new password substitute to transparently complete the subsequent sign-on to the secure legacy host application executing at the host system or the different legacy host application.

The digital certificate is preferably an X.509 certificate, and the digital certificate reference is preferably a reference to an X.509 certificate.

The communication protocol may be a 3270 emulation protocol, a 5250 emulation protocol, a Virtual Terminal protocol, etc. In the former case, the host access security system may be a Resource Access Control Facility (RACF) system.

The technique may further comprise: requesting by the legacy host application, responsive to establishing the session, first sign-on information for the user; responding to the request for first sign-on information by sending a first sign-on message with placeholders from the client machine to the server machine, the placeholders representing a user identification and a password of the user; substituting a user identifier associated with the located access credentials and the stored password or the generated password substitute for the placeholders in the first sign-on message; requesting, by the legacy host application, subsequent sign-on information for the user; responding to the request for subsequent sign-on information by sending a subsequent sign-on message with placeholders from the client machine to the server machine, the placeholders representing the user identification and the password of the user; and substituting the user identifier associated with the re-located access credentials and the re-accessed stored password or the new password substitute for the placeholders in the subsequent sign-on message.

In a second aspect, the server machine may be a Web application server machine. In this case, the technique may further comprise: requesting by the legacy host application, responsive to establishing the session, first sign-on information for the user; responding to the request for first sign-on information by supplying a user identifier associated with the located access credentials and the stored password or the generated password substitute at the server machine; requesting, by the legacy host application, subsequent sign-on information for the user; and responding to the request for subsequent sign-on information by supplying the user identifier associated with the re-located access credentials and the re-accessed stored password or the new password substitute at the server machine.

The present invention will now be described with reference to the following drawings, in which like reference numbers denote the same element throughout.

BRIEF DESCRIPTION OF THE DRAWINGS

FIG. 5 provides a textual version of protocol message flows which may be used to support this first preferred embodiment;

FIG. 9 provides a textual version of protocol message flows which may be used to support this second preferred embodiment.

DESCRIPTION OF THE PREFERRED EMBODIMENTS

Figure 1:
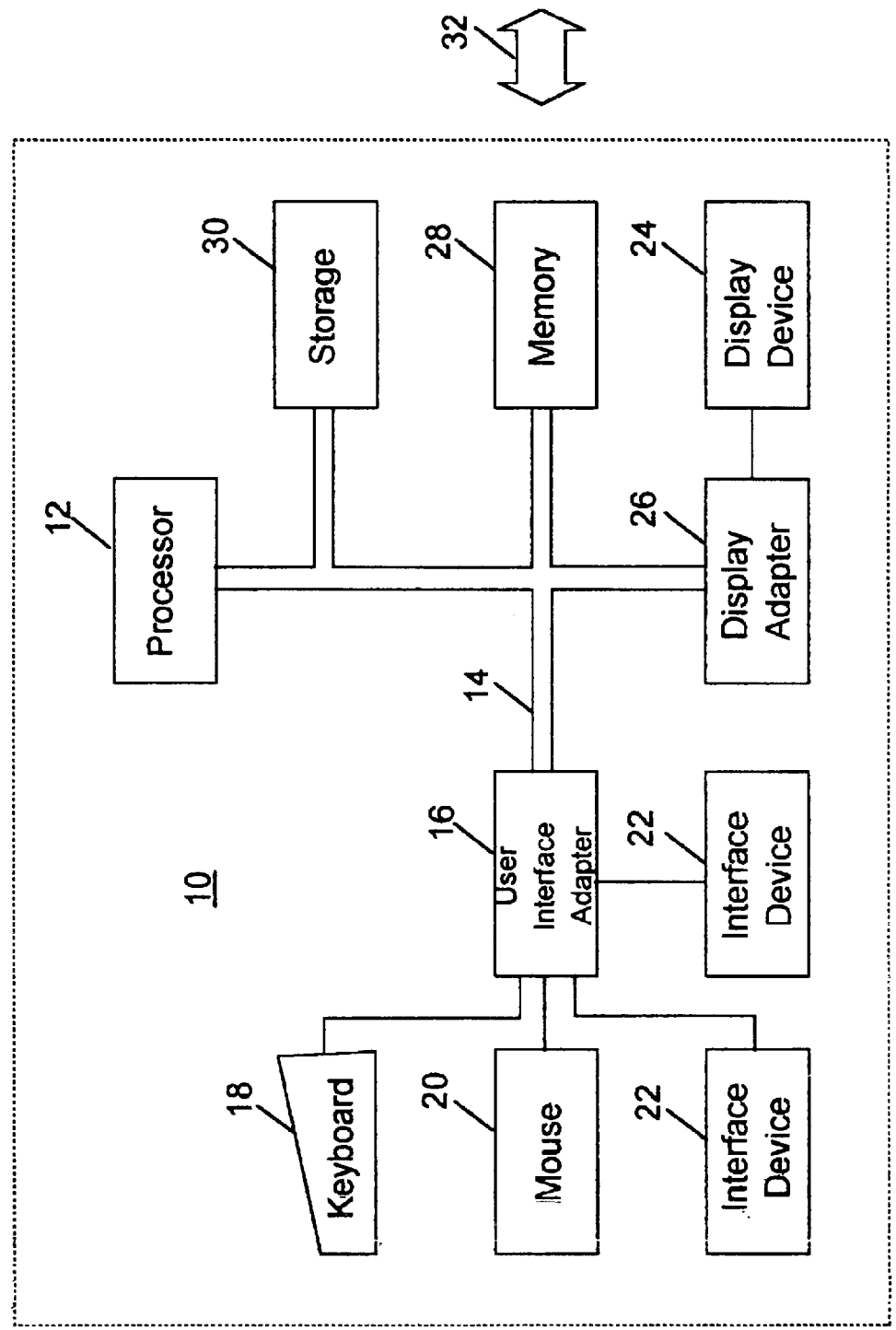
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network, the workstation 10 can be a client in a client/server arrangement with another computer, etc. All of these configurations, as well as the appropriate communications hardware and software, are known in the art.

Figure 2:
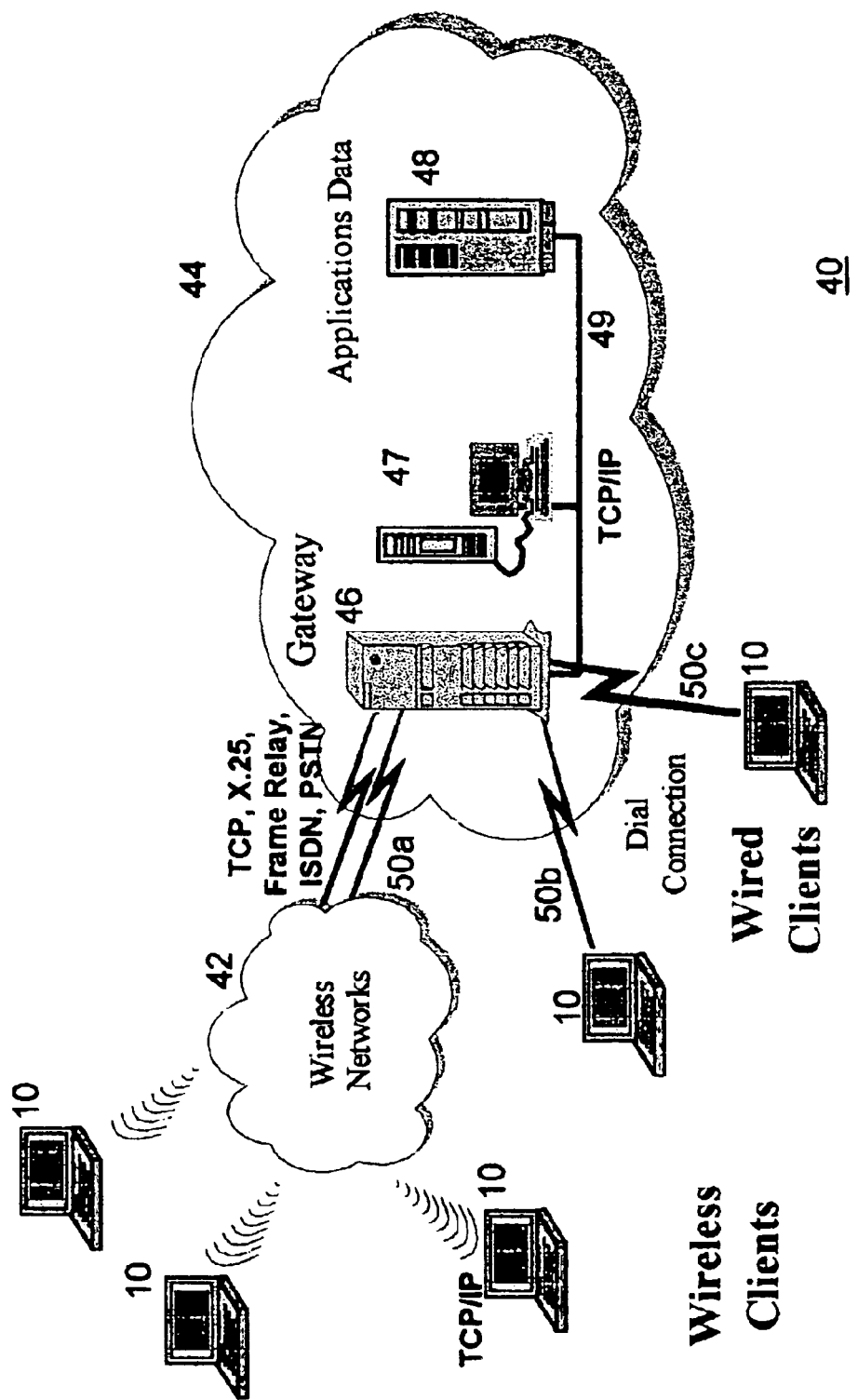
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 (e.g. of workstation 10 and server 46) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server and the intermediary, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiments, the present invention is implemented as one or more modules (also known as "objects" in object-oriented programming languages) of one or more computer software programs. This computer software will be used in an environment where a user in a modern distributed computing environment is accessing a host legacy application where the application and/or data it uses is protected by a host-based security system (such as RACF).

The first preferred embodiment of the present invention enables a user to provide a single system sign-on for accessing one or more legacy host applications and/or one or more systems which provide legacy host data (such as legacy database systems) during a secure host access session which is protected by a host-based security system, where the same set of credentials must be provided more than once during the secure session. (The user may also access applications and data which are available from a modern PC-based environment such as the Internet during the scope of this session, as provided by the related invention.)

As used herein, the phrase "legacy host application" is intended to refer equivalently to legacy host systems.

The second preferred embodiment of the present invention enables changing user credentials that are used to access legacy host applications which provide legacy host data during a secure host access session which is protected by a host-based security system, where these changed credentials are used to authenticate a user after previously-provided credentials have been used for authentication earlier in the same session. The changed credentials may belong to the same user, where that user happens to have different credentials for different puposes. For example, the user may have different credentials for accessing different legacy applications, and may wish to change from accessing one legacy host application to accessing another. Or, the changed credentials may be used to enable a different user to interact with the same legacy host application used by the previously-authenticated user. For example, the additional credentials may belong to another person such as the current user's supervisor, where that other person presents his credentials to certify or verify some action of the current user.

Figure 3:
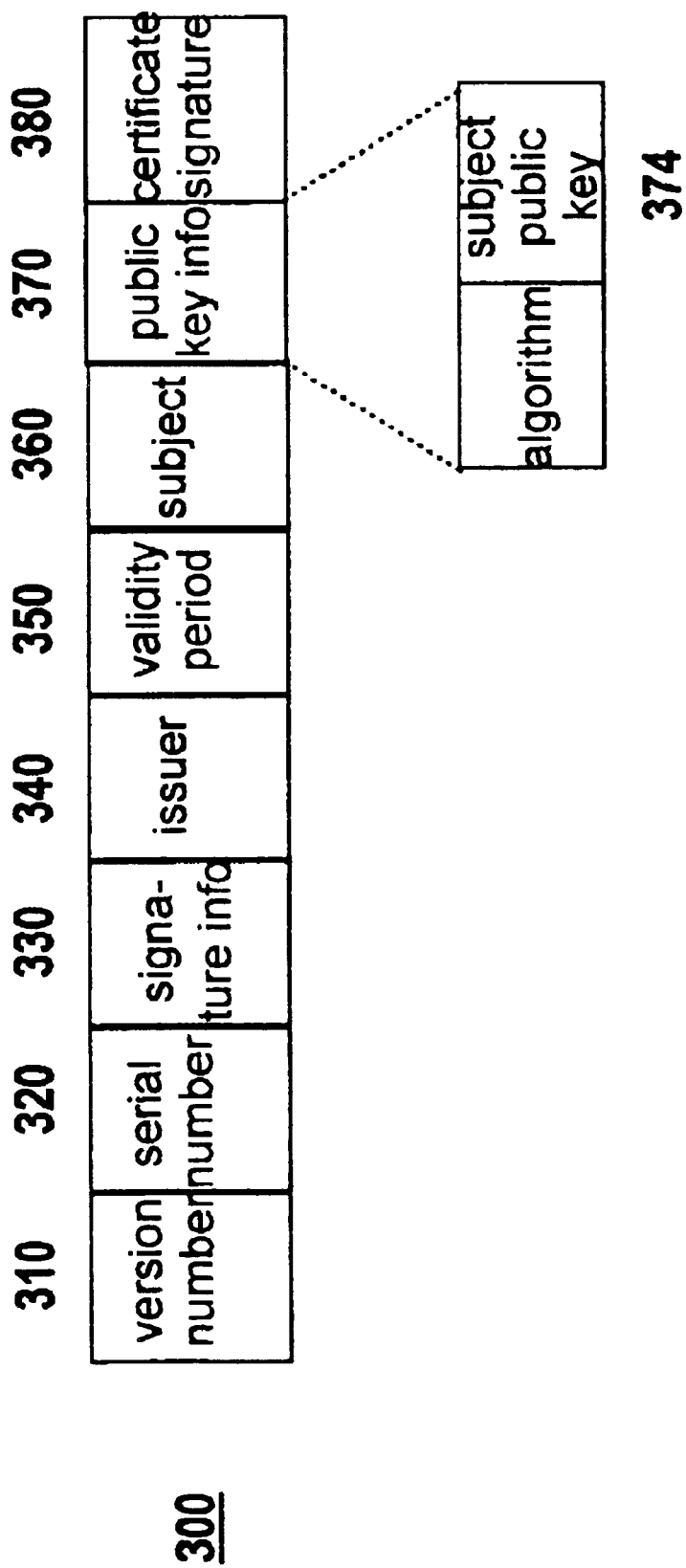
FIG. 3 depicts the format of an X.509 certificate that may be used with the preferred embodiments of the present invention.

The preferred embodiments of the present invention will now be discussed with reference to FIGS. 3 through 9. FIG. 3 depicts a digital certificate that may be used with both preferred embodiments. FIGS. 4 through 7 pertain to the first preferred embodiment. FIGS. 8 and 9 pertain to the second preferred embodiment.

In both preferred embodiments, a user who communicates with a legacy host application must be authenticated. Preferably, a digital certificate such as an X.509 certificate is used. This approach is consistent with the move in the industry towards use of digital certificates and standardized security protocols (such as SSL) for authentication of users who wish to access enterprise applications and data, as distributed computing and use of the Internet continues to rise. A digital certificate may be generated for a user using techniques which are known in the art, for example by contacting a certificate authority which issues such certificates. Techniques for obtaining a digital certificate do not form part of the present invention. Once a digital certificate is generated for a user, the certificate may be used according to the preferred embodiments of the present invention to enable users working in modern distributed computing environments to access resources which are protected by host access security systems such as RACF.

A certificate conforming to the X.509 standard (hereinafter referred to as an "X.509 certificate") is used in the preferred embodiments of the present invention, although other digital certificate formats may be used alternatively without deviating from the scope of the present invention. "X.509" is an International Telecommunication Union (ITU) Recommendation and International Standard that defines a framework for providing authentication. (See ITU Recommendation X.509 (1997), titled "Information Technology—Open Systems Interconnection—The Directory: Authentication Framework", dated 8/97. This information is also published in International Standard ISO/IEC 9594-8 (1995).) A certificate format is defined in this standard. Certificates created according to this international standard, in the defined format, are referred to as "X.509 certificates".

The format of an X.509 certificate is shown in FIG. 3. Hereinafter, references to "certificates" refer to the type of information shown in FIG. 3. The subject field 360 identifies the entity (e.g. the user) to which this certificate was issued. The preferred embodiments of the present invention use this subject field to identify the user, and to determine the user's access privileges for purposes of authentication. Extracting the information from the user's certificate and performing the authentication is automatic and transparent to the user. In this manner, the need for the user to explicitly (and redundantly) re-identify himself for purposes of communicating with a legacy host application, when the user's same credentials must be provided more than once during a secure host access session according to the first preferred embodiment, is avoided. By providing a different certificate that signifies changed credentials, the second preferred embodiment enables securely accessing applications with a changed identity, within a single secure host access session.

The technique with which a digital certificate is used for authentication is well known in the art and will not be described in detail herein. For purposes of the preferred embodiments discussed below with reference to FIGS. 4 through 9, it is assumed that the system users have already been issued one or more digital certificates and that the certificates are stored in such a manner that they are locally accessible to the client software operating on a user's workstation. Note that while the preferred embodiments are described herein in terms of transmitting a digital certificate, a reference to the digital certificate may be transmitted as an alternative. This reference may then by used by the receiver to retrieve the actual digital certificate, for example from a certificate registry or other repository. (In this case, the certificate might not be locally accessible to the client software.)

In a first aspect of the preferred embodiments (depicted in FIGS. 4–6 and FIGS. 8–9), the client device preferably uses some form of emulation or emulator product to allow communication between the distributed computing environment and the host application. For purposes of discussion herein, the client is assumed to be using an emulator product which uses the TN3270 emulation protocol. The TN3270 protocol is used to provide emulation of the "3270 data stream", as is well known to those familiar with the art. The 3270 data stream is frequently used for information transfer to and from legacy host applications, and is so named because it was originally designed for use with IBM Model 327x client workstations. However, discussion of 3270 emulation is for purposes of illustration and not of limitation. Other data stream formats may be used alternatively. Another commonly used data stream format for communicating with legacy host applications is referred to as a "5250 data stream", originally designed for communicating with IBM Model 525x workstations. The TN5250 emulation protocol is used with a 5250 data stream. Yet another commonly used data stream is an ASCII data stream, commonly referred to as a "Virtual Terminal" or "VT" data stream.

In a second aspect of the first preferred embodiment (depicted in FIG. 7), the client device is using software such as a browser to access a Web application server, and that Web application server operates as a TN3270 client to interact with a TN3270 server on behalf of the browser client.

Using emulator software for communicating with a legacy host application is well known in the art, and the software products which enable it are commercially available. One of the functions typically provided by such products is commonly referred to as "screen scraping". That is, the emulator software processes the data stream sent by a host application, searching for appearance of data which corresponds to a user interface screen intended for display on a prior art device such as a Model 321x display terminal. Upon recognizing a particular screen in the data stream, the emulator scrapes or extracts relevant data from the data stream, according to the layout and semantics of that screen. This extracted data is then typically re-formatted for use by a client software application which has a more modern type of user interface. When the client software has data to be transmitted to the host application, the emulator software receives that data and formats it for transmission to the host application, where the re-formatting enables the host application to accept the incoming data as if it was from a Model 327x screen-oriented device.

In the preferred embodiments, this approach to monitoring the datastream is used to provide a user's ID and password to a legacy application in an automated, transparent manner. Use of placeholder strings when sending messages between a client and server, as it applies to the first aspect of the preferred embodiments, was disclosed in the related application. The placeholder strings use a predetermined syntax which is agreed upon between the sending and receiving software. In the preferred embodiments of the present invention, the syntax "$USR.ID$" is used for the user ID placeholder, and the syntax "$PSS.WDS" is used for the password placeholder, although other representations may be used equivalently. Upon detecting the presence of a placeholder in a message received at the TN3270 server, the server knows that it needs to insert the actual value of the associated placeholder before forwarding this message to the host application.

In the preferred embodiments of the present invention, a macro may be written to execute at a client workstation which is performing emulation, to automate and mask injection of the placeholder strings. As used herein, "macro" refers to a sequence of host screen interactions, and the necessary actions to navigate them, which has been captured and recorded to enable using them in an automated manner at a later time. The macro includes application-specific information about the data stream traffic to be sent to and received from a particular legacy host application. IBM's Host On Demand product, for example, may be used to create macros of this type. As the macro is being created, a person such as a systems administrator will be asked to identify the location of the user ID and password during the sign-on sequence (e.g. on which panel(s) this information will be requested, and in what relative position within the data stream the response is to be returned), along with the identifier of the application. The macro configuration software will then store the application identifier (application ID) in the macro, along with the information on where to insert the placeholder strings for the user ID and password fields.

Once a macro of this type has been created, it may be distributed to the users within an enterprise to enable them to access the corresponding legacy host application. Typically, an icon will be created and displayed on the user's desktop to enable a user to conveniently launch the application by clicking on the icon. Or, if desired, a macro can be configured as an auto-logon macro which will play automatically at the beginning of a user's emulator session. Use of a macro or equivalent functionality by the TN3270 client is assumed for purposes of the present invention, where the macro operates to transparently detect occurrence of host screens of interest for a particular application and to respond appropriately to those host screens.

First Preferred Embodiment

Figure 4:
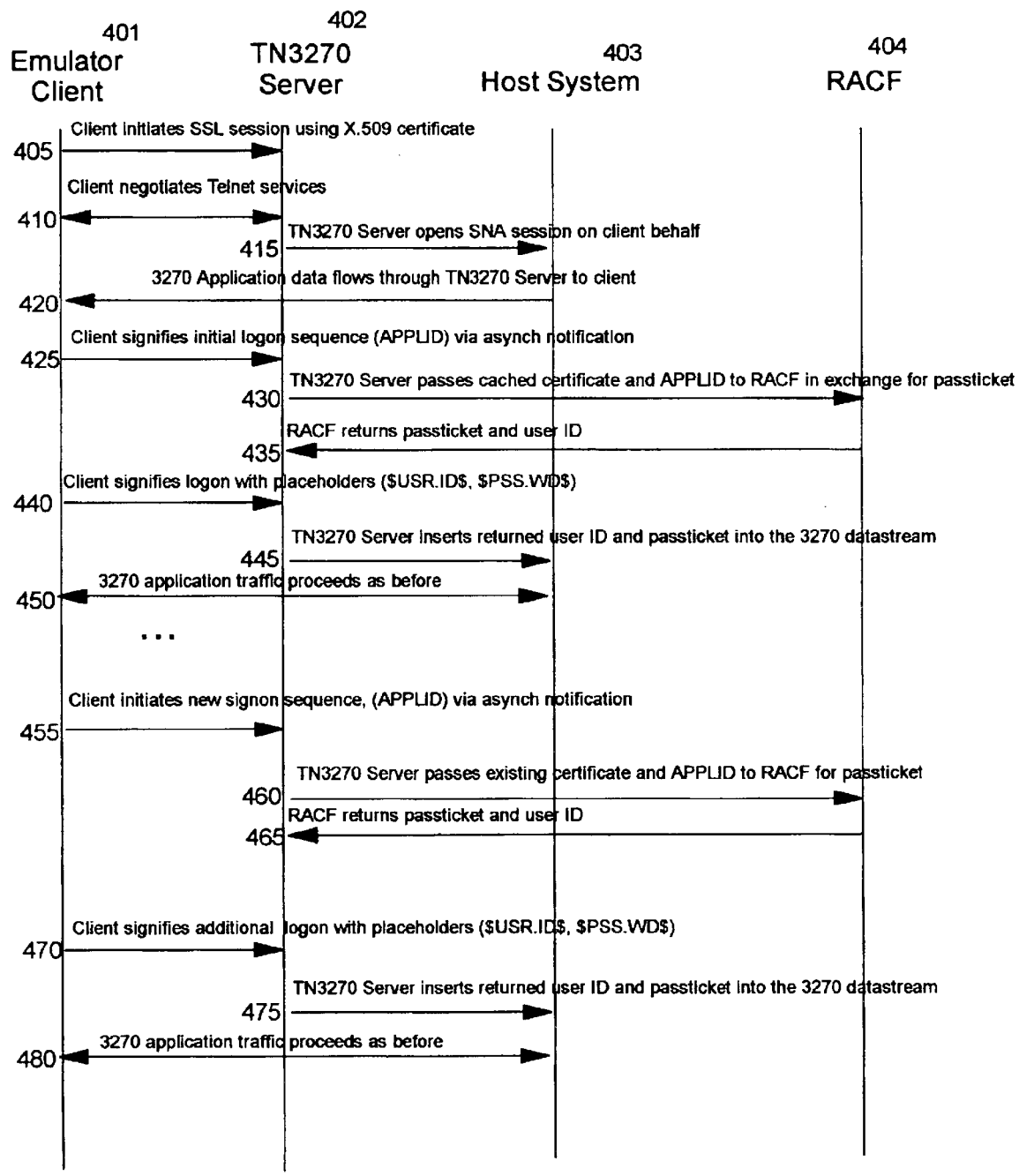
FIG. 4 illustrates message flows which enable a subsequent and transparent user sign-on to be provided during a certificate-based host session, according to a first preferred embodiment of the present invention which operates in a distributed computing environment using emulation software at a client device.

FIG. 4 depicts a representative sequence of message flows that may occur when the first preferred embodiment of the present invention is used to enable a subsequent sign-on for a user within the scope of a secure host access session. To begin the process depicted in FIG. 4, the user of emulator client 401 requests establishment of a secure host access session, for example by clicking on an icon that will invoke a host access macro. In response, the client software initiates a secure session (which is an SSL, TLS, or equivalent session in all of the preferred embodiments of the present invention) using an X.509 certificate, as shown at 405. ("TLS", or Transaction Layer Security, is an SSL follow-on having similar messages and capabilities.)

Typically the user will be prompted to identify the certificate that is to be used for this session, as a particular user may have multiple certificates. As stated above, it is assumed that the digital certificate is stored such that it is accessible to the client software 401. The user may be prompted to enter a Personal Identification Number (PIN) or to use some other means (such as providing biometric information, etc.) in order to unlock access to the securely-stored certificate. The server 402 authenticates the user of client 401 using the digital certificate received at 405 as part of the existing SSL session establishment procedure. The server then caches (or otherwise stores) the certificate for later use. Alternatively, rather than transmitting a certificate which is locally stored at client 401, a reference to a certificate may be transmitted, as is known in the art. This reference is then used by TN3270 server 402 to retrieve an associated certificate, which is then cached or otherwise stored at the server.

The client 401 and server 402 then negotiate 410 various Telnet services that are to be used on the secure host access session. The particular protocol messages which may be used during this negotiation in a first aspect of the first preferred embodiment are described in more detail below, with reference to FIG. 5.

Since this client 401 desires to interact with the host system 403, at 415 the server 402 opens an SNA session (or other similar host access session) with the host system 403 on behalf of the client. At 420, the host application responds by sending application data formatted as a 3270 data stream to the client 401. This data passes through the server 402 where it is transformed from a 3270 data stream to a data stream (such as a standard TN3270 data stream) suitable for the emulator client. This initial data from the host application is typically some type of "sign-on" screen asking for a user name (or other user identifier) and password. It should be noted that at this point, no interaction with the RACF program 404 has occurred, since the host application is responsible for providing the client's user name and password to the RACF system for authentication. At 425, the macro or equivalent software executing at client 401 automatically responds to a sign-on request by sending a message containing the application ID for the initial target application in an asynchronous notification to server 402.

Upon receiving this initial sign-on sequence with the application ID parameter, TN3270 server 402 starts to scan the datastream coming from the client, searching for the placeholder strings for the user ID and password. To limit the duration of this scanning process, one approach which may be used is to scan until a complete set of placeholder strings for the password and user ID pair has been processed (i.e. detected and then replaced), in either order, or until some predetermined number of bytes (such as 10,000 bytes) has been received, whichever comes first.

Message 425 also triggers the server to locate the client's cached X.509 certificate, which was obtained at 405 during SSL session establishment. This cached certificate is then passed, together with the application ID, in flow 430 to the host-based RACF 404 software (as described in more detail below, with reference to FIG. 6). The RACF system extracts the user's identification from the subject field of the client certificate, and uses this information to locate the user's stored credentials and access privileges as they pertain to the target application. For example, the value of the subject field may be used as a key to access a stored repository of credentials, where the data in the repository has been previously created by a person such as a systems administrator. Or, the subject field may be used to access a lookup table of such information, or to access a lookup table which provides a correlation to a key used to access a credential repository (such as a subject value-to-credential key correlation). The manner in which the credentials are stored is outside the scope of the present invention.

The RACF secured sign-on procedure is then invoked at the RACF implementation 404, using techniques which are known in the art. "RACF secured sign-on" is a procedure for enabling clients to sign on to a host and communicate securely without sending RACF passwords across a network. Instead, a dynamically-generated short-lived credential referred to as a "passticket" is generated by the RACF software as a password substitute. Passtickets, and the procedure with which they are generated, are known in the art. As an alternative (for example, in other host access systems other than RACF) to generating a passticket, an actual password may be retrieved by the host access security system, where this password may then be used directly instead of using a passticket as a password substitute. References herein to use of a "passticket" are to be interpreted as referring equivalently to use of a password supplied by the host access security system.

The passticket represents the access privileges for the user identified by the subject field of the digital certificate transmitted at 430. The RACF software 404 sends 435 this passticket to the server 402, along with the user ID (or user name) to which it corresponds (i.e. the user ID associated with the credentials and application ID for which the passticket was generated).

At some point, client 401 transmits message 440 which includes placeholder strings for the user's ID and password values. When a macro is used at the client workstation, this macro is preferably written to supply a message which provides the placeholder strings in response to a request from the host application for the user's ID and password, as stated previously. The server intercepts message 440, inserts the returned user ID and passticket into the 3270 data stream in place of the placeholders (completing the log on request message 425 from the client software 401), and sends the resulting data stream to the host 403 at 445. Using this passticket and user identification data, the legacy host application can determine the user's access privileges in the manner with which it has already been programmed (e.g. by transmitting the user ID and passticket to RACF for verification, after which the RACF software will return a positive response to the host application). The host application 403 and the client 401 then interact as shown at 450 to perform functions of the legacy application.

At some point during this interaction, it may become necessary for the user to provide his security credentials again. For example, the host application may be written to display a menu which prompts the user to re-enter his user ID and/or password. Or, the user may indicate that he or she wishes to change to a different host application, where the user's ID and password must be supplied as that different application begins execution. According to the first preferred embodiment of the present invention, the credentials are provided again in a manner that is transparent to the user— that is, the user is not required to re-enter his user ID and password. Instead, the macro or equivalent software executing at the client 401 transparently provides information needed for the subsequent sign-on. In the scenario depicted in FIG. 4, the client software asynchronously initiates access to a different application (for example, by playing the stored commands of a different macro), sending message 455 to the server 402 where this message indicates the application identifier. (This application ID may be the same as, or different from, the application ID transmitted in message 425.)

Upon receiving notice of the new sign-on sequence, the server 402 restarts the process of scanning the data stream coming from the client 401, looking for user ID and password placeholder strings, in the same manner described above. The server 402 also sends a message 460 to the RACF software 404 which includes the application ID from message 455, along with the cached certificate which was received at 405 (or, alternatively, a reference to this cached certificate). This message 460 requests a passticket from the RACF system, as has been described with reference to message 430. The RACF software performs an authentication of the user's credentials, as described with reference to message 430, and returns a response 465 which includes a passticket and an identification of the user for whom this passticket was generated. At some point, client 401 transmits message 470 which has user ID and password placeholders, signifying the subsequent sign-on. The server 403 inserts the user identification and passticket from message 465 into this message 470, and passes it to the host application at 475. The host application uses this information as described above for message 445. In this manner, the first embodiment of the present invention enables a subsequent authorization process to be performed for the subsequently-provided sign-on information without requiring the user to re-enter his user ID or password. The interaction between client 401 and host application 403 proceeds in the normal manner, as shown at 480.

FIG. 5 illustrates a textual version of protocol message flows which may be used to support this aspect of the first preferred embodiment. In this first aspect, where the client is using TN3270 emulation, the TN3270 client and server are negotiating their capabilities using the Telnet protocol where one party can request whether the other part supports a particular function by issuing the Telnet DO command immediately followed by the function requested. The other party signals support for the requested function by responding with the Telnet WILL command immediately followed by the function supported. In the preferred embodiment of this aspect during the Telnet negotiations between the TN3270 client and server, the protocol defined in Request For Comments (RFC) 1572, titled "Telnet Environment Option" and dated January 1994, is used. This RFC is incorporated herein by reference. The protocol defined in RFC 1572 enables passing environment information between a Telnet client and Telnet server. This aspect of the first preferred embodiment uses the NEW-ENVIRON command to negotiate support of the passticket function and of the capability for transmitting an application ID from a client (such as that shown on messages 425 and 455) during an ongoing session.

The protocol message flows indicated at 510 in FIG. 5 correspond to message flow 410 of FIG. 4. Initiation of the negotiation process occurs as in the prior art. During this negotiation process, the server sends the "IAC DO NEW-ENVIRON" command, which tells the client that the server is willing to receive environment variables. The client agrees to send environment variables by responding with the "IAC WILL NEW-ENVIRON" command. The server then asks the client to transmit particular ones of its environment variables by sending the "IAC SB NEW-ENVIRON SEND" command. The parameters included on that command for this aspect of the first preferred embodiment are for determining the client's support of the passticket function and application ID, as stated above. These parameters are transmitted using USERVAR syntax, which is provided by RFC 1572 to allow use of application-specific variable names and values. The syntax shown in FIG. 5 for the parameters is USERVAR PASSTICKET and USERVAR APPLID, although other names may be given to the environment variables without deviating from the scope of the present invention.

The client's response to this protocol message is shown in FIG. 5 as the "IAC SB NEW-ENVIRON IS" command, having parameters "USERVAR PASSTICKET VALUE YES" and "USERVAR APPLID VALUE". The PASSTICKET parameter value of "YES" indicates that the client supports passtickets, and the APPLID parameter has a null value which indicates that no application ID is being sent at this (session-establishment) time.

At this point in a normal sign-on sequence, the Telnet protocol negotiations are complete and the sign-on sequence can commence. The server then sends "USS MSG 10" to the client, which signifies that an initial sign-on screen is to be displayed. The host access macro (or equivalent software) invoked by the user begins to play, and recognizes screens being sent from the host application. Once the application ID is available, the client responds to the sign-on request by sending the command "IAC SB NEW-ENVIRON INFO" with the USERVAR APPLID parameter as shown at 525, where the parameter value specifies the application which is to be accessed. As shown in the example of FIG. 5, the first application the user requests access to is "RALVMS". (As stated previously, the macro is created to insert the correct application ID in this protocol message.) This protocol message corresponds to message 425 in FIG. 4. The server then uses this application ID, along with the cached certificate, to obtain a passticket for the user (as described with reference to messages 430 and 435 of FIG. 4). (At some point following this message 525, the placeholder strings which were described with reference to message 440 of FIG. 4 appear, although this has not been depicted in FIG. 5.)

Suppose that the user now signs off of application RALVMS, and starts another macro to sign on to an application having identifier "TSO1". The protocol message flow which enables this application change in this preferred embodiment is shown at 555 in FIG. 5, where the client sends the command "IAC SB NEW-ENVIRON INFO" with the USERVAR APPLID parameter which has its value set to the new application ID (TSO1, in the example). This protocol message corresponds to message flow 455 in FIG. 4. Note that the protocol message specifying the new application ID may be generated asynchronously, providing users of the present invention a very flexible and powerful solution for accessing legacy host applications in a distributed computing environment.

Figure 6:
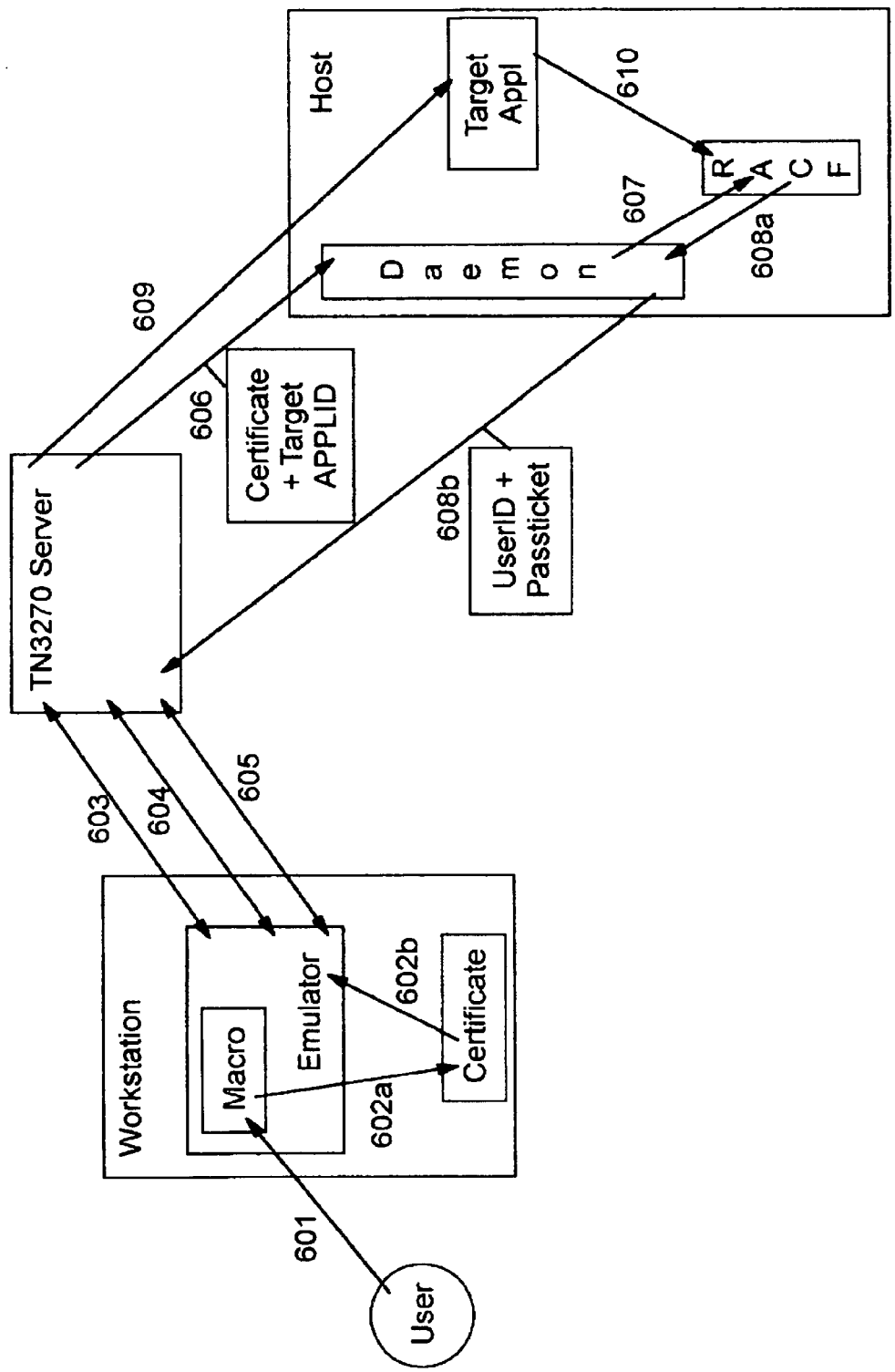
FIG. 6 depicts the components which may be involved in an implementation of the first preferred embodiment.

FIG. 6 depicts the components which may be used in the first preferred embodiment of the present invention, and shows how the messages which have been described flow between these components. At 601, the user clicks on an icon which starts a host access session macro configured to use SSL client authentication. Assuming that the macro operates in auto-logon mode, it immediately unlocks 602a a certificate file using, e.g., a PIN supplied by the client. The certificate is made available 602b for use in the SSL handshake. During the SSL handshake, the user's certificate is passed 603 to the TN server and validated. This prior art validation process uses public key authentication, as is known in the art. If the certificate is determined to have been revoked, the handshaking protocol will not complete successfully. The passticket capability is then negotiated 604, as discussed with reference to FIG. 5.

Sign-on screens are sent 605 to the client as in the prior art. However, instead of prompting the user to enter a user ID and password, the macro plays and inserts the placeholder strings. When the placeholder strings reach the TN3270 server, they are intercepted. Assuming the user's certificate passed the checks during the handshaking protocol, the server sends 606 the user's certificate (in binary format) and the application ID on a secure, trusted connection to a daemon program running on the host system. In the preferred embodiment, this daemon is the IBM Digital Certificate Access Server (DCAS) which runs on the System/390®. ("System/390" is a registered trademark of IBM.) The DCAS daemon then calls 607 the RACF software. RACF uses the certificate to determine the user's ID, and generates a passticket based on a combination of the user ID and the target application ID. The user ID and passticket are then returned 608a, 608b to the TN3270 server. The server then inserts the passticket and user ID into the intercepted message, in place of the placeholder strings, and forwards them 609 to the target legacy application at the host. The legacy application software presents 610 the user ID and passticket to RACF, which approves them, and the sign-on process completes.

Note that the configuration shown in FIG. 6 assumes use of a three-tier system where the TN3270 server and host application reside on different machines. Thus, the connection between them needs to be secure and trusted. If a two-tier system is used where the TN3270 function operates on the same host system as the host application, then the passticket daemon is not used; instead, the RACF calls are issued in-line by the TN3270 component.

Note also that more than one host system may be involved when using the preferred embodiments of the present invention. For example, the RACF software may reside on a different host than the target host application.

Figure 7:
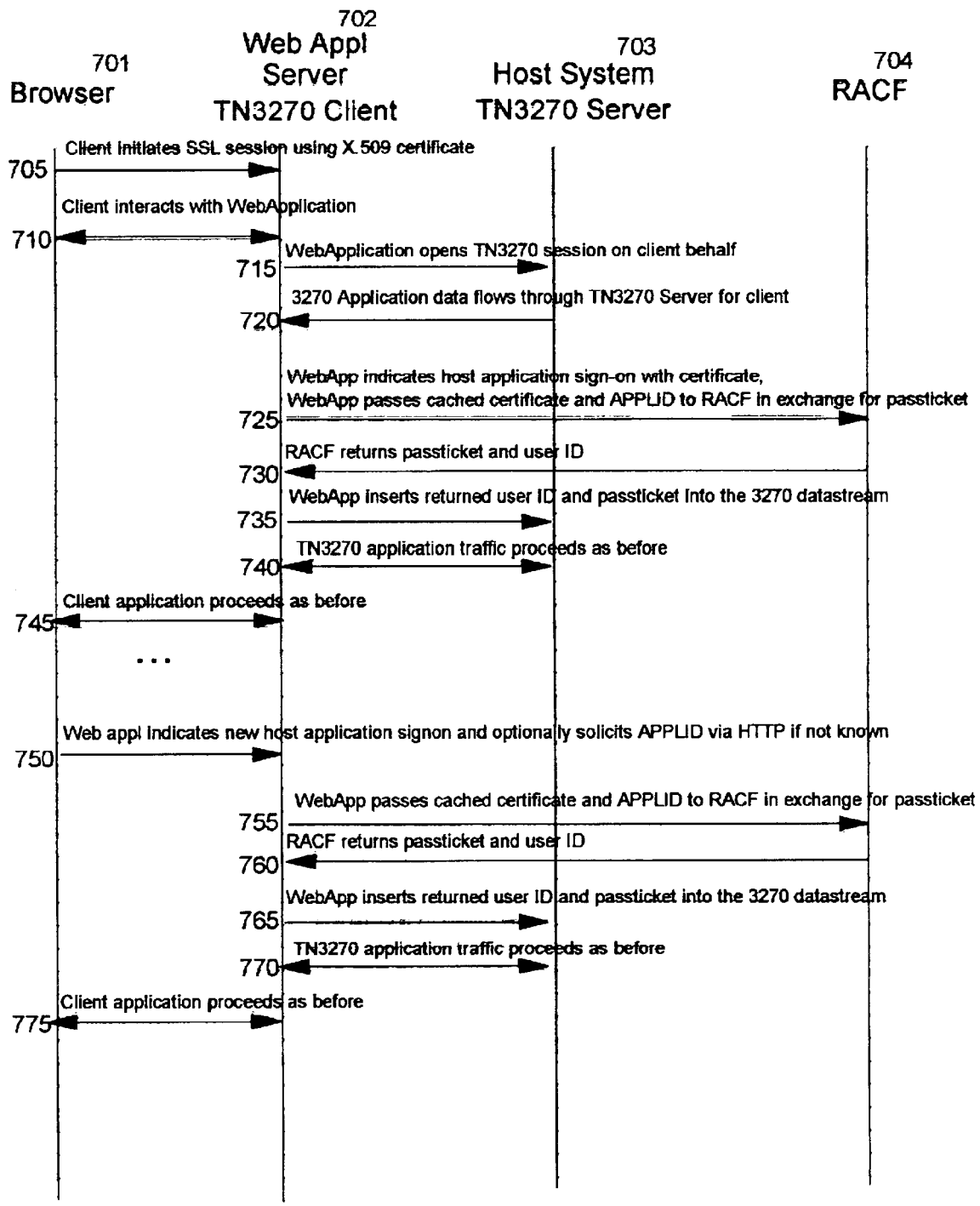
FIG. 7 illustrates flows which are similar to those of FIG. 4, but which are used when operating in a Web Application environment.
Figure 8:
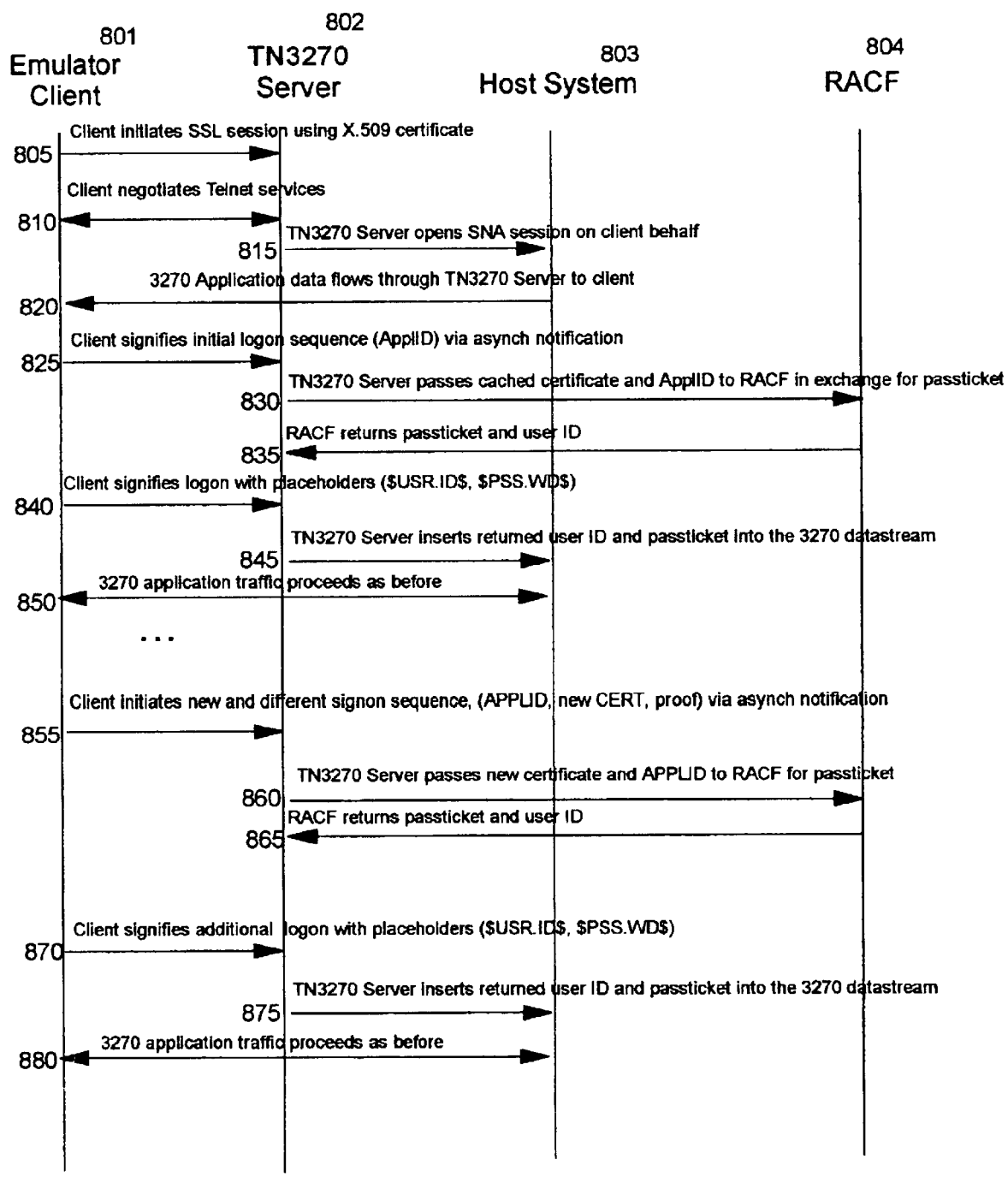
FIG. 8 illustrates message flows which enable changed user credentials to be provided during a certificate-based host session, according to a second preferred embodiment of the present invention which operates in a distributed computing environment using emulation software at a client device.

FIG. 7 depicts flows which may be used for the first preferred embodiment when operating in a Web Application environment. In this second aspect of the first preferred embodiment, the Web application server 702 is functioning as a proxy for client 701, intercepting and responding to messages on behalf of the client 701, which uses a browser or other similar software. As indicated in FIG. 7, the client's browser 701 initiates 705 an SSL session and provides a digital certificate (preferably an X.509 certificate, as previously described with reference to the certificate 300 of FIG. 3) to the Web application server 702. The Web application server 702 authenticates the client using this digital certificate as in the prior art and caches (or otherwise stores) the certificate for later use. The client 701 then begins interaction with the Web application server 702 as shown at 710. Since the client desires to interact with the host system 703, the Web application server 702 initiates a 3270 session (using the TN3270 emulation protocol) at 715 with the host application located on host server 703. The 3270 data stream application data flows at 720 from the host application 703 to the Web application server 702.

The Web application server at 725 signifies to the host server that the client wishes to log on to an application. Typically, the application software executing on the Web application server 702 will prompt the user with special input prompts (for example, by presenting a Web page form for the user to fill in) to supply his identification and password information. According to the related invention, however, the Web application server application software automatically and transparently uses the cached client's certificate 300 (which was obtained during flow 705) to supply this information. The Web application server locates the previously-stored client certificate, and includes it along with the target application ID in message 725 which is sent to the RACF implementation 704. As described above, RACF uses the digital certificate to extract a user ID or name (from subject field 360) and to generate a passticket representing the credentials of that user after accessing stored credential information. At 730, RACF returns the user ID and passticket through the host server 703 to the Web application server 702. As disclosed in the related invention, the Web application server 702 then inserts the user ID and passticket information into the 3270 data stream expected by the host application and sends it, at 735, to the host server 703. The legacy host application uses this information to allow the user to access protected applications and/or data, without requiring changes to the host application itself. Traffic flows between the host server 703 and the Web application server 702 at 740 as in the prior art. Interaction between the legacy host application and client 701 (shown at 745) occurs also as in the prior art.

At some time later, the Web application at browser client 701 indicated a new host application sign-on sequence (which, as described for the first aspect, may be to the same application currently in use or to a different application), as shown at 750. The Web application server 702 may need to solicit the application ID (e.g. using a HyperText Transfer Protocol, or "HTTP", message) from the client 701, if this information is not already available to the server. In response to receiving message 750, the Web application server retrieves the previously-cached certificate (received in flow 705), and sends 755 this certificate (or a reference thereto) along with the application ID to RACF 704 in the same manner which has been described for message 460 of FIG. 4. (Note that the TN3270 server is not required to scan the 3270 data stream for the user ID and password in this aspect, as the correct values are automatically provided by the TN client.) The RACF response, including the generated passticket, is received at 760. The Web application server then uses this information to send 765 to the host application at host system 703. The host application verifies the user's credentials using this passticket and user ID, and traffic between the host application and Web application server proceeds as in the prior art, as shown at 770. The client application 701 then proceeds to interact 775 with the now-current host application.

Second Preferred Embodiment

FIG. 8 depicts a sequence of message flows that may occur when the second preferred embodiment of the present invention is used to enable changed user credentials to be provided during a subsequent sign-on within the scope of a secure host access session. The message flows from 805 through 850 are identical to those in FIG. 4 which are numbered 405 through 450, and provide for establishing a secure host access session in which a user interacts with a first host application. Element 910 of FIG. 9 depicts the protocol message flows which correspond to message 810 of FIG. 8 and which may be used during negotiation of Telnet services between client 801 and server 802 in this second preferred embodiment. These protocol messages are described in more detail below.

In FIG. 8, receipt of message 855 indicated that the client wishes to use different credentials. As previously discussed, this message may be sent to enable a previously-authenticated user to use different credentials, or to enable a different user to authenticate himself to an application within the same secure session. As indicated in message 855, a new certificate (or, alternatively, a reference thereto) transmitted from client 801, along with an identifier of the application, in this asynchronous notification. In addition, this message 855 includes additional information that is used to prove that the sender is the legitimate owner of the certificate (i.e. is authorized to use the certificate). The manner in which this message is formatted and in which the authorization proof is provided in this second preferred embodiment is discussed in more detail below, with reference to element 955 of FIG. 9. This new certificate is cached or otherwise stored at server 802, and is forwarded (see message 860) to RACF 804 along with the user ID and application identifier from message 855. The processing of message flows 860 through 880 is analogous to those numbered 460 through 480 in FIG. 4, except that message 860 passes the certificate which was received on message flow 855 instead of the certificate received during the SSL session establishment flows (and the passticket returned at 865 then represents the access privileges of this new certificate.

FIG. 9 illustrates a textual version of protocol message flows which may be used to support this second preferred embodiment. As in the first aspect of the first preferred embodiment, the protocol defined in RFC 1572 is preferably used for this second preferred embodiment where the client is using TN3270 emulation.

As described with reference to FIG. 5, the Telnet negotiations include the server and client exchanging DO and WILL commands, after which the server requests the client to indicate its support for a number of environment variables. In this second preferred embodiment, the PASSTICKET parameter and APPLID parameter are used as described above for the first preferred embodiment. Additional parameters, which in the example shown in FIG. 9 have the syntax "CERTIFICATE", "RSEED . . . ", and "AUTHINFO", are used on the NEW-ENVIRON command, as shown in elements 910 and 955. The server first transmits these parameters on a "NEW-ENVIRON SEND" command, and the client responds with a "SEW-ENVIRON IS" command. Preferably, the client sends a YES value to indicate its support of the PASSTICKET function, and null values for the APPLID parameter and for each of the additional parameters (to indicate that the client supports that environment variable, but does not yet have a value defined).

The new additional parameters are used, according to the second embodiment of the present invention, as proof to authenticate the identity of the certificate sender. The first of the additional parameters, "CERTIFICATE", is used to convey the contents of a digital certificate. The "RSEED . . . " parameter (see 910) is used to able the server to pass a random value to the client. The random number value is concatenated to the environment variable name, enabling the server to pass variable data to the client even though an explicit capability for transmitting values from the sender of the DO command is not provided in RFC 1572. For example, if the random number is 1490285673237, then the environment variable is passed from the server in the NEW-ENVIRON SEND command as "USERVAR RSEED1490285673237", and returned from the client in the NEW-ENVIRON IS command as "USERVAR RSEED1490285673237 VALUE". (Note: this example is not intended to be representative of the optimal length of the random seed value.) Both the client and server record the value to be used as the random seed value for later use. The client and server will use this random value, along with a sequence number, to prevent replay attacks. The "AUTHINFO" parameter is used to transmit authentication information from the client to the server, as will now be described.

The first NEW-ENVIRON INFO command 925 sent by the client after the Telnet negotiations end is used to transmit the application ID for which the user's initially-provided credentials are to be used. This first INFO command is analogous to that described above with reference to FIG. 5, and again shows the user requesting the application "RALVMS". (At some point following this message 925, the placeholder strings which were described with reference to message 840 of FIG. 8 appear, although this has not been depicted in FIG. 9.)

When the user needs to supply changed credentials during the secure session, either to the same application or to a different application (such as "TSO1", as used in this example), this second preferred embodiment sends the protocol message format shown at element 955 (which corresponds to message flow 855 of FIG. 8). The new certificate (or a reference thereto) is now sent to the server as the value of the USERVAR CERTIFICATE parameter. This information is insufficient on its own for authenticating the changed credentials, because the server cannot trust that the credentials are being sent by the actual certificate holder. Thus, this second preferred embodiment uses the AUTHINFO parameter to provide additional authentication information which will enable the server to establish that the certificate sender is the legitimate certificate holder. The value to be sent as the USERVAR AUTHINFO value is computed by first concatenating the random seed value, followed by a sequence number, followed by the application ID value. The concatenated string is then digitally signed using the private key associated with the certificate being transmitted in the USERVAR CERTIFICATE parameter. Preferably, the sequence number which is used begins at a predefined value such as 0 and is incremented each time the client undergoes an identity change during the scope of this secure session. The application ID may be omitted from the concatenated value if desired, without deviating from the scope of the present invention. However, it is used in this second preferred embodiment to bind the digitally signed authentication information to the current application sign-on, which then makes it more difficult for a security exposure to extend beyond the scope of a single host application. As will be obvious to one of skill in the art, the server determines whether the legitimate certificate holder sent the subsequent sign-on by using the public key 374 from the transmitted certificate to decrypt the AUTHINFO parameter value. Upon decrypting the value, the server compares the concatenated information to the server's copy of the random seed and sequence number, and to the application ID sent on the APPLID parameter.

In this manner, the server can authenticate the changed credentials during the on-going session in a manner that is transparent to the legacy host application. Note that while this second preferred embodiment has been described herein as being applicable for the scenario where user credentials are to be changed in a subsequent sign-on, this technique may also be used advantageously in the first aspect of the first preferred embodiment (i.e. where the credentials are not changing), where the originally-provided certificate is transmitted from the client to the server using the additional USERVAR parameters described with reference to FIG. 9. In effect, transmitting the certificate in this manner separates authentication of the user to use the legacy host application from authentication of the client (i.e. the client's user) to participate in a Telnet session with the Telnet server. Furthermore, while different message formats are shown at 925 and 955 of FIG. 9, the message format used at 955 may alternatively be used in all cases when using this second preferred embodiment (and/or when using the first aspect of the first preferred embodiment), if desired.

The components which were illustrated in FIG. 6 may also be used in this second preferred embodiment of the present invention, in the manner which has been described.

While preferred embodiments of the present invention have been described, additional variations and modifications in those embodiments may occur to those skilled in the art once they learn of the basic inventive concepts. In particular, alternative data streams (such as a 5250 data stream or a VT data stream) may be used which provide the communications between the user's modern PC-based computer system and the legacy host applications and data. Further, security software other than the IBM RACF software may be used for protecting host-based assets, and techniques other than the RFC 1575 protocol may be used to convey information between the client and server provided that functionality equivalent to that described herein is supported. Therefore, it is intended that the appended claims shall be construed to include a preferred embodiment and all such variations and modifications as fall within the spirit and scope of the invention.

What is claimed is:

1. A computer program product for enabling a subsequent user sign-on during a certificate-based host access session, said computer program product embodied on a computer-readable medium and comprising:

computer-readable program code means for processing a first sign-on during a secure session using a digit certificate, further comprising:

computer-readable program code means for establishing said secure session from a client machine to a server machine using said digital certificate, wherein said digital certificate represents an identity of said client machine or a user thereof;

computer-readable program code means for storing said digital certificate or a reference thereto at said server machine;

computer-readable program code means for establishing a session from said server machine to a host system using a legacy host communication protocol, responsive to receiving, at said server machine, a first sign-on request from said client machine, wherein said first sign-on request identifies a first secure legacy host application to which said first sign-on is requested;

computer-readable program code means for passing said stored digital certificate or said reference from said server machine to a host access security system;

computer-readable program code means, operable in said host access security system, for authenticating said identity using said passed digital certificate or a retrieved certificate which is retrieved using said reference;

computer-readable program code means, operable in said host access security system, using said passed or a retrieved digital certificate to locate access credentials for said user;

computer-readable program code means, operable in said host access security system, for accessing a stored password or generating a password substitute representing said located credentials;

computer-readable program code means, operable in said host access security system, for returning said stored password or generated password substitute to said server machine, along with a first user identifier corresponding to said located credentials;

computer-readable program code means, operable in said server machine, for receiving a first sign-on message from said client machine, wherein said first sign-on message uses placeholder syntax, said placeholder syntax representing a user identification and a password of said user, wherein said user identification and said password are expected in said first sign-on message by said first secure legacy host application; and computer-readable program code means, operable in said server machine, for using said returned password or password substitute and said returned first user identifier to transparently complete said first sign-on, on behalf of said user of said client machine, to said first secure legacy host application executing at said host system by substituting said returned first user identifier and said returned password or password substitute for said placeholder syntax in said first sign-on message, thereby creating a revised first sign-on message, and forwarding said revised first sign-on message from said server machine to said first secure legacy host application; and computer-readable program code means for processing a subsequent sign-on of said user during said secure session using said digital certificate, further comprising:

computer-readable program code means for receiving a subsequent sign-on request, at said server machine from said client machine, wherein: (1) said subsequent sign-on request identifies a second secure legacy host application to which said subsequent sign-on is requested; (2) said subsequent sign-on requires authenticating a request of said subsequent sign-on; (3) said second secure legacy host application may be identical to said first secure legacy host application; and (4) said requester of said subsequent sign-on is said user;

computer-readable program code means, operable at said server machine, for retrieving said stored digital certificate or reference;

computer-readable program code means for passing said retrieved digital certificate or reference from said server machine to said host access security system;

computer-readable program code means, operable in said host access security system, for re-authenticating said identify of said user, thereby authenticating said request, using said passed retrieved digital certificate or retrieved reference;

computer-readable program code means, operable in said host access security system, for using said passed retrieved digital certificate or retrieved reference to re-locate said access credentials for said user;

computer-readable program code means, operable in said host access security system, for re-accessing said stored password or generating a new password substitute representing said re-located credentials;

computer-readable program code means, operable in said host access security system, for returning said re-accessed stored password or generated new password substitute to said server machine, along with said user identifier corresponding to said re-located credentials; and computer-readable program code means, operable in said server machine, for using said returned re-accessed password or new password substitute and said returned user identifier corresponding to said re-located credentials to transparently complete said subsequent sign-on, on behalf of said requester, to said second secure legacy host application at said host system.

2. The computer program product as claimed in claim 1, wherein said digital certificate is an X.509 certificate and said digital certificate reference is a reference to an X.509 certificate.

3. The computer program product as claimed in claim 1, wherein said communication protocol is a 3270 emulation protocol.

4. The computer program product as claimed in claim 1, wherein said host access security system is a Resource Access Control Facility (RACF) system.

5. The computer program product as claimed in claim 1, wherein said communication protocol is a 5250 estimulation protocol.

6. The computer program product as claimed in claim 1, wherein said communication protocol is a Virtual Terminal protocol.

7. The computer program product as claimed in claim 1, wherein:

said computer-readable program code means for processing said subsequent sign-on further comprises:
computer-readable program code means for requesting, by said second secure legacy host application, subsequent sign-on information for said requester; and
computer-readable program code means for responding to said request for subsequent sign-on information by sending a subsequent sign-on message with placeholders from said client machine to said server machine, said placeholders representing said user identification and said password of said user; and said computer-readable program code means for using said returned re-accessed password or new password substitute and said returned user identifier corresponding to said re-located credentials to trasnparently complete said second sign-on further comprises:
computer-readable program code means for substituting said returned user identifier corresponding to said re-located credentials and said returned re-accessed password or new password substitute for said placeholders in said subsequent sign-on message, thereby creating a revised subsequent sign-on message; and computer-readable program code means for forwarding said revised subsequent sign-on message from said server machine to said second secure legacy host application.

8. The computer program product as claimed in claim 1, wherein said server machine is a Web application server machine.

9. The computer program product as claimed in claim 8, wherein:

said computer-readable program code means for using said returned password or password substitute and said returned first user identifier to transparently complete said first sign-on further comprises:
computer-readable program code means for requesting by said first secure legacy host application, responsive to said computer-readable program code means for establishing said session, first sign-on information for said user; and
computer-readable program code means for responding to said request for first sign-on information by supplying, from said server machine to said first secure legacy host application, said returned user identifier and said returned password or password substitute.

10. The computer program product as claimed in claim 8, wherein said computer-readable program code means for processing said subsequent sign-on further comprises:
computer-readable program code means for requesting, by said second secure legacy host application, subsequent sign-on information for said requester; and
computer-readable program code means for responding to said request for subsequent sign-on information by supplying, from said client machine to said second secure legacy host application, said returned user identifier associated with said re-located credentials and said returned re-accessed password or new password substitute.

11. A system for enabling a subsequent user sign-on during a certificate-based host access session, comprising:
means for processing a first sign-on during a secure session using a digit certificate, further comprising:
means for establishing said secure session from a client machine to a server machine using said digital certificate, wherein said digital certificate represents an identity of said client machine or a user thereof;
means for storing said digital certificate or a reference thereto at said server machine;
means for establishing a session from said server machine to a host system using a legacy host communication protocol, responsive to receiving, at said server machine, a first sign-on request from said client machine, wherein said first sign-on request identifies a first secure legacy host application to which said first sign-on is requested;
means for passing said stored digital certificate or said reference from said server machine to a host access security system;
means, operable in said host access security system, for authenticating said identity using said passed digital certificate or a retrieved certificate which is retrieved using said reference;
means, operable in said host access security system, using said passed or retrieved digital certificate to locate access credentials for said user;
means, operable in said host access security system, for accessing a stored password or generating a password substitute representing said located credentials;

means, operable in said host access security system, for returning said stored password or generated password substitute to said server machine, along with a first user identifier corresponding to said located credentials;

means, operable in said server machine, for receiving a first sign-on message from said client machine, wherein said first sign-on message uses placeholder syntax, said placeholder syntax representing a user identification and a password of said user, wherein said user identification and said password are expected in said first sign-on message by said first secure legacy host application; and means, operable in said server machine, for using said returned password or password substitute and said returned first user identifier to transparently complete said first sign-on, on behalf of said user of said client machine, to said first secure legacy host application executing at said host system by substituting said returned first user identifier and said returned password or password substitute for said placeholder syntax in said first sign-on message, thereby creating a revised first sign-on message, and forwarding said revised first sign-on message from said server machine to said first secure legacy host application; and means for processing a subsequent sign-on of said user during said secure session using said digital certificate, further comprising:

means for receiving a subsequent sign-on request, at said server machine from said client machine, wherein: (1) said subsequent sign-on request identifies a second secure legacy host application to which said subsequent sign-on is requested; (2) said subsequent sign-on requires authenticating a request of said subsequent sign-on; (3) said second secure legacy host application may be identical to said first secure legacy host application; and (4) said requester of said subsequent sign-on is said user;

means, operable at said server machine, for retrieving said stored digital certificate or reference;

means for passing said retrieved digital certificate or reference from said server machine to said host access security system;

means, operable in said host access security system, for re-authenticating said identify of said user, thereby authenticating said request, using said passed retrieved digital certificate or retrieved reference;

means, operable in said host access security system, for using said passed retrieved digital certificate or retrieved reference to re-locate said access credentials for said user;

means, operable in said host access security system, for re-accessing said stored password or generating a new password substitute representing said re-located credentials;

means, operable in said host access security system, for returning said re-accessed stored password or generated new password substitute to said server machine, along with said user identifier corresponding to said re-located credentials; and means, operable in said server machine, for using said returned re-accessed password or new password substitute and said returned user identifier corresponding to said re-located credentials to transparently complete said subsequent on behalf of said requester, to said second secure legacy host application at said host system.

12. The system as claimed in claim 11, wherein said digital certificate is an X.509 certificate and said digital certificate reference is a reference to an X.509 certificate.

13. The system as claimed in claim 11, wherein said communication protocol is a 3270 emulation protocol.

14. The system as claimed in claim 13, wherein said host access security system is a Resource Access Control Facility (RACF) system.

15. The system as claimed in claim 11, wherein said server machine is a Web application server machine.

16. The system as claimed in claim 15, wherein:

said means for using said returned password or password substitute and said returned first user identifier to transparently complete said first sign-on further comprises:

means for requesting by said first secure legacy host application, responsive to said means for establishing said session, first sign-on information for said user; and means for responding to said request for first sign-on information by supplying, from said server machine to said first secure legacy host application, said returned user identifier and said returned password or password substitute.

17. The system as claimed in claim 15, wherein said means for processing said subsequent sign-on further comprises:

means for requesting, by said second secure legacy host application, subsequent sign-on information for said requester; and means for responding to said request for subsequent sign-on information by supplying, from said server machine to said second secure legacy host application, and returned user identifier associated with said re-located credentials and said returned re-accessed password or new password substitute.

18. The system as claimed in claim 11, wherein:

said means for precessing said subsequent sign-on further comprises:

means for requesting, by said second secure legacy host application, subsequent sign-on information for said requester; and means for responding to said request for subsequent sign-on information by sending a subsequent sign-on message with placeholders from said client machine to said server machine, said placeholders representing said user identification and said password of said user; and said means for using said returned re-accessed password or new password substitute and said returned user identifier corresponding to said re-located credentials to transparently complete said second sign-on further comprises:

means for substituting said returned user identifier corresponding to said re-located credentials and said returned re-accessed password or new password substitute for said placeholders in said subsequent sign-on message, thereby creating a revised subsequent sign-on message; and means for forwarding said revised subsequent sign-on message from said server machine to said second secure legacy host application.

19. A method for enabling a subsequent user sign-on during a certificate-based host access session, comprising the steps of:

processing a first sign-on during a secure session using a digit certificate, further comprising the steps of:

establishing said secure session from a client machine to a server machine using said digital certificate, wherein said digital certificate represents an identity of said client machine or a user thereof;

storing said digital certificate or a reference thereto at said server machine;

establishing a session from said server machine to a host system using a legacy host communication protocol, responsive to receiving, at said server machine, a first sign-on request from said client machine, wherein said first sign-on request identifies a first secure legacy host application to which said first sign-on is requested;

passing said stored digital certificate or said reference from said server machine to a host access security system;

authenticating, by said host access security system, said identity using said passed digital certificate or a retrieved certificate which is retrieved using said reference;

using, by said host access security system, said passed or a retrieved digital certificate to locate access credentials for said user;

accessing, by said host access security system, a stored password or generating a password substitute representing said located credentials;

returning, by said host access security system, said stored password or generated password substitute to said server machine, along with a first user identifier corresponding to said located credentials;

receiving, by said server machine, a first sign-on message from said client machine, wherein said first sign-on message uses placeholder syntax, said placeholder syntax representing a user identification and a password of said user, wherein said user identification and said password are expected in said first sign-on message by said first secure legacy host application; and using, by said server machine, said returned password or password substitute and said returned first user identifier to transparently complete said first sign-on, on behalf of said user of said client machine, to said first secure legacy host application executing at said host system by substituting said returned first user identifier and said returned password or password substitute for said placeholder syntax in said first sign-on message, thereby creating a revised first sign-on message, and forwarding said revised first sign-on message from said server machine to said first secure legacy host application; and processing a subsequent sign-on of said user during said secure session using said digital certificate, further comprising the steps of:

receiving a subsequent sign-on request, at said server machine from said client machine, wherein: (1) said subsequent sign-on request identifies a second secure legacy host application to which said subsequent sign-on is requested; (2) said subsequent sign-on requires authenticating a requester of said subsequent sign-on; (3) said second secure legacy host application may be identical to said first secure legacy host application; and (4) said requester of said subsequent sign-on is said user;

retrieving, by said server machine, said stored digital certificate or reference;

passing said retrieved digital certificate or reference from said server machine to said host access security system;

re-authenticating, by said host access security system, said identify of said user, thereby authenticating said requester, using said passed retrieved digital certificate or retrieved reference;

using, by said host access security system, said passed retrieved digital certificate or retrieved reference to re-locate said access credentials for said user;

re-accessing, by said host access security system, said stored password or generating a new password substitute representing said re-located credentials;

returning, by said host access security system, said re-accessed stored password or generated new password substitute to said server machine, along with said user identifier corresponding to said re-located credentials; and using, by said server machine, said returned re-accessed password or new password substitute and said returned user identifier corresponding to said re-located credentials to transparently complete said subsequent sign-on, on behalf of said requester, to said second secure legacy host application excuting at said host system.

20. The method as claimed in claim 19, wherein said digital certificate is an X.509 certificate and said digital certificate reference is a reference to an X.509 certificate.

21. The method as claimed in claim 19, wherein said communication protocol is a 3270 emulation protocol.

22. The method as claimed in claim 21, wherein said host access security system is a Resource Access Control Facility (RACF) system.

23. The method as claimed in claim 9, wherein said server machine is a Web application server machine.

24. The method as claimed in claim 23, wherein:

said step of using said returned password or password substitute and said returned first user identifier to transparently complete said first sign-on further comprises the steps of:

requesting by said first secure legacy host application, responsive to said step of establishing said session, first sign-on information for said user; and responding to said request for first sign-on information by supplying, from said server machine to said first secure legacy host application, said returned user identifier and said returned password or password substitute.

25. The method as claimed in claim 23, wherein said step of processig said subsequet sign-on further comprises the steps of:

requesting, by said second secure legacy host application, subsequent sign-on information for said requester; and responding to said request for subsequent sign-on information by supplying, from said server machine to said second secure legacy host application, and returned user identifier associated with said re-located credentials and said returned re-accessed password or new password substitute.

26. The system as claimed in claim 19, wherein:

said step of precessing said subsequent sign-on further comprises the steps of:

requesting, by said second secure legacy host application, subsequent sign-on information for said requester; and responding to said request for subsequent sign-on information by sending a subsequent sign-on message with placeholders from said client machine to said server machine, said placeholders representing said user identification and said password of said user; and said step of using said returned re-accessed password or new password substitute and said returned user identifier corresponding to said re-located credentials to trasnparently complete said second sign-on further comprises the steps of:
  substituting said returned user identifier corresponding to said re-located credentials and said returned re-accessed password or new password substitute for said placeholders in said subsequent sign-on message, thereby creating a revised subsequent sign-on message; and
  forwarding said revised subsequent sign-on message from said server machine to said second secure legacy host application.

27. A computer-implemented method for enabling an identity to be subsequently provided during a certificate based host access session, comprising steps of:
  establishing a secure session between a client and a server using a digital certificate owned by a user of said client;
  remembering said digital certificate at said server;
  completing a first sign-on to a host application, by said server on behalf of said user, resposive to receiving an asynchonous sign-on request from said client that identifies said host application, further comprising the steps of:
    using said remembered digital certificate to authenticate said user to a host access security component;
    if said user is authenticated, locating, by said host access security component, access credentials of said user;
    creating, by said host access security component, a passticket that represents said located access credentials;
    returning said passticket from said host access security component to said server, along with a user identifier associated with said located access credentials; and
    inserting, by said server, said passticket and said user identifier into a log-on message in place of placeholders for a user password and said user identifier, when said log-on message is received at said server from said client, thereby creating a revised log-on message, in a form expected by said host application, that is then sent from said server to sign said user on to said host application; and
  completing a subsequent sign-on to a second host application, by said server on behalf of said user, responsive to receiving a second asynchronous sign-on request from said client that identifies said second host application, wherein said second host application may be identical to said host application, further comprising the steps of:
    passing said remembered digital certificate from said server to said host access security component for authenticating said user for access to said second host application;
    if said user is authenticated for access to said second host application, locating, by said host access security component, second access credentials of said user, wherein said second access credentials may be identical to said located access credentials;
    creating, by said host access security component, a second passticket that represents said located second access credentials of said user;
    returning said second passticket from said host access security component to said server, along with a second user identifier associated with said second located access credentials; and
    inserting said returned second passticket and said returned second user identifier into a subsequent log-on message in place of placeholders for a second user password and said second user identifier, when said second log-on message is received at said server from said client, thereby creating a second revised log-on message, in said form expected by said second host application, that is then sent from said server to sign said user on to said second host application.

28. A method of providing subsequent user identification during a secure session, comprising steps of:
  upon receiving a first log-on message containing placeholder syntax from a client during a secure session, substituting therefor a user identifier and a first password substitute provided by a host access security system upon authentication of user a credentials associated with the client and with a user thereof, thereby creating a revised first log-on message in a form expected by a first legacy host application, the first password substitute representing access privileges associated with the user credentials for the first legacy host application;
  forwarding the revised first log-on message to the first legacy host application for completing a secure sign-on thereto;
  upon receiving a second log-on message containing placeholder syntax from the client during the secure session, substituting therefor the user identifier and a second password substitute provided by the host access security system upon authentication of the user credentials associated with the client and with the user thereof, thereby creating a revised second log-on message in a form expected by a second legacy host application, the second password substitute representing access privileges associated with the user credentials for the second legacy host application, wherein the second legacy host application may be identical to the first legacy host application; and
  forwarding the revised second log-on message to the second legacy host application for completing a secure sign-on thereto.

* * * * *

UNITED STATES PATENT AND TRADEMARK OFFICE
CERTIFICATE OF CORRECTION

PATENT NO. : 6,934,848 B1
APPLICATION NO. : 09/619205
DATED : August 23, 2005
INVENTOR(S) : King et al.

It is certified that error appears in the above-identified patent and that said Letters Patent is hereby corrected as shown below:

Column 2,
Line 4, change "entitles" to --entities --;
Line 7, change "teaches a teaches a" to -- teaches a --;

Column 16,
Line 44, change "indicated" to -- indicates --;

Column 20,
Line 12, change "using" to -- for using --;
Line 13, change "a retrieved" to -- retrieved --;
Line 56, change "a request of" to -- a requester of --;

Column 21,
Line 3, change "identify" to -- identity --;
Line 4, change "said request" to -- said requester --;

Column 22,
Line 33, change "said client machine" to -- said server machine --;
Line 41, change "using a digit certificate" to -- using a digital certificate --;

Column 23,
Line 34, change "a request of" to -- a requester of --;
Line 65, change "subsequent on behalf" to -- subsequent sign-on, on behalf --;
Line 66, change "application at" to -- application executing at --;

Column 24,
Line 67, change "digit certificate" to -- digital certificate --;

Column 26,
Line 30, change "claim 9" to -- claim 19 --;
Line 46, change "processig said subsequet" to -- processing said subsequent --;
Line 52, change "application, and returned" to -- application, said returned --;
Line 57, change "of precessing" to -- of processing --;

UNITED STATES PATENT AND TRADEMARK OFFICE
CERTIFICATE OF CORRECTION

PATENT NO. : 6,934,848 B1
APPLICATION NO. : 09/619205
DATED : August 23, 2005
INVENTOR(S) : King et al.

It is certified that error appears in the above-identified patent and that said Letters Patent is hereby corrected as shown below:

Column 27,
Line 16 carrying over to line 17, change "certificate based" to -- certificate-based --;
Line 23, change "asynchonous" to -- asynchronous --.

Signed and Sealed this

Fifteenth Day of August, 2006

JON W. DUDAS
*Director of the United States Patent and Trademark Office*